(12) United States Patent
Grah et al.

(10) Patent No.: US 7,335,327 B2
(45) Date of Patent: *Feb. 26, 2008

(54) METHOD OF SHRINKING A FILM

(75) Inventors: Michael D. Grah, Simpsonville, SC (US); Marvin R. Havens, Greer, SC (US)

(73) Assignee: Cryovac, Inc., Duncan, SC (US)

( * ) Notice: Subject to any disclaimer, the term of this patent is extended or adjusted under 35 U.S.C. 154(b) by 83 days.

This patent is subject to a terminal disclaimer.

(21) Appl. No.: 10/749,451

(22) Filed: Dec. 31, 2003

(65) Prior Publication Data

US 2005/0142313 A1    Jun. 30, 2005

(51) Int. Cl.
*B29B 13/08* (2006.01)
*B29C 47/00* (2006.01)

(52) U.S. Cl. .................. 264/342 R; 264/405; 977/842; 977/888

(58) Field of Classification Search ............... 264/405, 264/211, 342 R; 977/842, 888
See application file for complete search history.

(56) References Cited

U.S. PATENT DOCUMENTS

| | | | |
|---|---|---|---|
| 4,017,715 A | 4/1977 | Whitney | |
| 4,085,286 A | 4/1978 | Horsma et al. | |
| 4,335,935 A | 6/1982 | Pohlack | |
| 4,421,582 A | 12/1983 | Horsma et al. | |
| 4,871,559 A | 10/1989 | Dunn et al. | |
| 5,110,530 A | 5/1992 | Havens | |
| 5,117,094 A | 5/1992 | Jensen | |
| 5,424,054 A | 6/1995 | Bethune et al. | |
| 5,691,101 A * | 11/1997 | Ushirogouchi et al. | ..... 430/176 |
| 5,753,088 A | 5/1998 | Olk | |
| 5,756,577 A | 5/1998 | Gutierrez-Villarreal | |
| 6,063,243 A | 5/2000 | Zettl et al. | |
| 6,071,626 A | 6/2000 | Frisk | |
| 6,184,280 B1 | 2/2001 | Shibuta | |
| 6,188,043 B1 | 2/2001 | Owensby | |
| 6,265,466 B1 | 7/2001 | Glatkowski et al. | |
| 6,331,209 B1 | 12/2001 | Jang et al. | |
| 6,331,265 B1 | 12/2001 | Dupire et al. | |
| 6,333,016 B1 | 12/2001 | Resasco et al. | |

(Continued)

FOREIGN PATENT DOCUMENTS

EP    0 308 106 A2    3/1989

(Continued)

OTHER PUBLICATIONS

Smith et al., "Electron irradiation effects in single wall carbon nanotubes", Journal of Applied Physics, vol. 90, No. 7, Oct. 1, 2001, pp. 3509-3515.*

(Continued)

*Primary Examiner*—Christina Johnson
*Assistant Examiner*—Patrick Butler
(74) *Attorney, Agent, or Firm*—Daniel B. Ruble

(57) ABSTRACT

A method of shrinking a film comprises the steps of providing a shrink film and exposing the film to an amount of radiation energy effective to activate the shrink characteristic of the film. The film comprises one or more thermoplastic polymers and at least about 0.001 weight % of single-walled carbon nanotube material based on the weight of the film.

37 Claims, 1 Drawing Sheet

U.S. PATENT DOCUMENTS

| | | |
|---|---|---|
| 6,355,287 B2 * | 3/2002 | Noel et al. ............... 426/127 |
| 6,413,487 B1 | 7/2002 | Resasco et al. |
| 6,426,134 B1 | 7/2002 | Lavin et al. |
| 6,427,419 B2 | 8/2002 | Owensby |
| 6,449,923 B1 | 9/2002 | Cook, Jr. et al. |
| 6,451,175 B1 | 9/2002 | Lai |
| 6,455,021 B1 | 9/2002 | Saito |
| 6,517,800 B1 | 2/2003 | Cheng et al. |
| 6,541,744 B2 | 4/2003 | Von Arx et al. |
| 6,861,135 B2 | 3/2005 | Zhou |
| 6,861,481 B2 | 3/2005 | Ding et al. |
| 2002/0025490 A1 | 2/2002 | Shchegolikhin et al. |
| 2002/0040900 A1 | 4/2002 | Arx et al. |
| 2002/0122765 A1 | 9/2002 | Horiuchi et al. |
| 2002/0135105 A1 | 9/2002 | Easter |
| 2002/0150678 A1 | 10/2002 | Cramer et al. |
| 2002/0197923 A1 | 12/2002 | Tobita et al. |
| 2003/0008123 A1 | 1/2003 | Glatkowski et al. |
| 2003/0100654 A1 | 5/2003 | Chheang et al. |
| 2003/0104190 A1 | 6/2003 | Zhou |
| 2003/0158323 A1 | 8/2003 | Connell et al. |
| 2004/0121144 A1 | 6/2004 | Zhou |
| 2004/0241482 A1 * | 12/2004 | Grah et al. ............... 428/518 |
| 2004/0254282 A1 | 12/2004 | Suzuki et al. |
| 2005/0119364 A1 * | 6/2005 | Grah et al. ............... 522/150 |

FOREIGN PATENT DOCUMENTS

| | | |
|---|---|---|
| EP | 0 308 106 A3 | 3/1989 |
| EP | 1 054 036 A1 | 11/2000 |
| EP | 1 447 427 A1 | 8/2004 |
| EP | 1 541 322 A2 | 6/2005 |
| GB | 1 528 193 | 10/1978 |
| JP | 55079209 | 6/1980 |
| JP | 2000-204272 | 7/2000 |
| JP | 2003082202 | 3/2003 |
| JP | 2003138040 | 5/2003 |
| WO | 97/15934 | 1/1997 |
| WO | WO 97/07069 | 2/1997 |
| WO | 01/92381 A1 | 12/2001 |
| WO | 03/026532 A2 | 4/2003 |

OTHER PUBLICATIONS

Matsui et al "Effect of Ultraviolet Light Irradiation on Gas Permeability in Polyimide Membranes . . ." Journal of Polymer Science: Part B: Polymer Physics, vol. 35, 2259-2269 (Jan. 1997).

Chivers "Easy removal of pressure sensitive adhesives for skin applications" International Journal of Adhesion & Adhesives 21, p. 381-88 (Jan. 2001).

Chivers et al "Investigations into the mechanisms of adhesion of a novel light-deactivatable pressure-sensitive adhesive" Adhesion '99 Conference Pre-Prints, 7$^{th}$ International Conference on Adhesion and Adhesives, p. 37-42 (Sep. 15-17, 1999).

Tikhomirova et al, "Reversible changes in the gaseous permeability of poylmers during gamma-irradiation" L. Ya. Karpov Physical Chemistry Institute and the Institue of Plastic Industry, Proceeding of the Academy of Sciences of the USSR, Physical Chemistry Section, English Translation, vol. 130, No. 5, pp. 1081-1084 1950, translation vol. 130 Nos. 1-6, pp. 171-174 Jan.-Feb. 1960.

Ullmann's Encyclopedia of Industrial Chemistry, vol. 6, pp. 370-378 (6$^{th}$ edition Jan. 2003).

P. McEuen et al., "Single-Walled Carbon Nanotube Electronics," IEEE Transactions on Nanotechnology, vol. 1, Mar. 2002, pp. 78-85.

X. Liu et al., Molecular Nanoelectronics, Chapter 1 "Carbon Nanotubes: Synthesis, Devices, and Integrated Systems," pp. 1-20 (Jan. 2003).

D. Kasuya et al, "Formation of $C_{60}$ using $CO_2$ laser vaporization of graphite at room temperature," Chemical Physics Letters 337 (Mar. 30, 2001) pp. 25-30.

C. Zhu et al, "Anti-infrared/ultraviolet property of fullerene-containing polyacrylate film," Plastics, Rubbers, and Composites.

"Polymeric Carbon Nanocomposites from Carbon Nanotubes Functionalized with Matrix Polymer", Macromolecules, 2003, 36, pp. 7199-7204.

"Nanotubes in a Fash—Ignition and Reconstruction", Ajayan et al, Science, vol. 296, p. 705, Apr. 26, 2002.

* cited by examiner

METHOD OF SHRINKING A FILM

BACKGROUND OF THE INVENTION

The present invention relates to thermoplastic shrink films and methods of shrinking a film.

Activating the shrink characteristic of a heat-shrinkable film may be accomplished by immersing the film in a hot-water bath or conveying the film through a hot-air tunnel. However, such exposure may also undesirably heat the product (e.g., a food product) that is enclosed within a package comprising the shrink film, and requires the bath or tunnel equipment.

SUMMARY OF THE INVENTION

The present invention addresses one or more of the aforementioned problems. A method of shrinking a film comprises the following steps. A film is provided comprising one or more thermoplastic polymers. The film also comprises at least about 0.001 weight % of single-walled carbon nanotube material based on the weight of the film. The film has a free shrink at 185° F. in at least one of the machine or transverse directions of at least about 5% measured according to ASTM D 2732. The film is exposed to an amount of radiation energy effective to activate the shrink characteristic of the film.

In another aspect of the invention, a film comprises one or more thermoplastic polymers and at least about 0.001 weight % of single-walled carbon nanotube material based on the weight of the film. The film has a free shrink at 185° F. in at least one of the machine or transverse directions of at least about 5% measured according to ASTM D 2732.

These and other objects, advantages, and features of the invention may be more readily understood and appreciated by reference to the detailed description of the invention and the drawings.

DETAILED DESCRIPTION OF THE INVENTION

Figure 1:
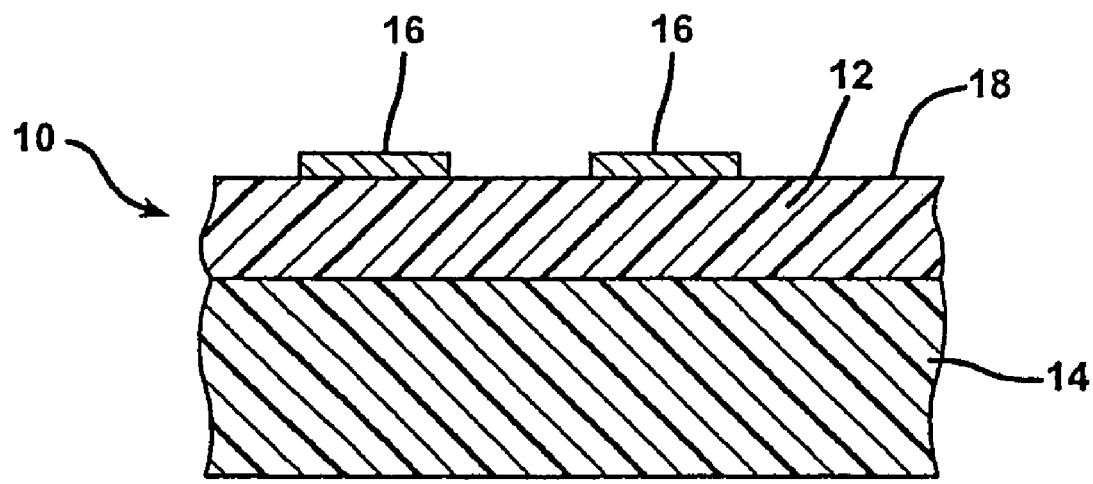
FIG. 1 is a representational cross-section of a film of one embodiment of the invention.

A heat-shrinkable film comprises single-walled carbon nanotube ("SWNT") material. The shrink characteristic of the film may be activated by exposing the film to an effective amount of radiation energy.

Heat-Shrinkable Film

The film or a layer of the film may comprise one or more thermoplastic polymers, for example, polyolefins (e.g., polyethylene, polypropylene), ethylene/vinyl alcohol copolymers, ionomers, vinyl plastics (e.g., polyvinyl chloride, polyvinylidene chloride), polyamide, and polyester. The film, or any of the film layers (e.g., any of the film layers discussed below), may comprise at least about, or at most about, any of polymers discussed below in any of the following weight percent values: 30, 40, 45, 50, 55, 60, 65, 70, 75, 80, 85, 90, 95, 97, 99 and 100% by weight of the film or by weight of the layer. The film may be a packaging film, such as a food packaging film.

Polyolefins

Useful polyolefins include ethylene homo- and co-polymers and propylene homo- and co-polymers. The term "polyolefins" includes copolymers that contain at least 50 weight % monomer units derived from olefin. Ethylene homopolymers include high density polyethylene ("HDPE") and low density polyethylene ("LDPE"). Ethylene copolymers include ethylene/alpha-olefin copolymers ("EAOs"), ethylene/unsaturated ester copolymers, and ethylene/(meth) acrylic acid. ("Copolymer" as used in this application means a polymer derived from two or more types of monomers, and includes terpolymers, etc.)

EAOs are copolymers of ethylene and one or more alpha-olefins, the copolymer having ethylene as the majority mole-percentage content. The comonomer may include one or more $C_3$-$C_{20}$ α-olefins, one or more $C_4$-$C_{12}$ α-olefins, and one or more $C_4$-$C_8$ α-olefins. Useful α-olefins include 1-butene, 1-hexene, 1-octene, and mixtures thereof.

EAOs include one or more of the following: 1) medium density polyethylene ("MDPE"), for example having a density of from 0.926 to 0.94 g/cm3; 2) linear medium density polyethylene ("LMDPE"), for example having a density of from 0.926 to 0.94 g/cm3; 3) linear low density polyethylene ("LLDPE"), for example having a density of from 0.915 to 0.930 g/cm3; 4) very-low or ultra-low density polyethylene ("VLDPE" and "ULDPE"), for example having density below 0.915 g/cm3, and 5) homogeneous EAOs. Useful EAOs include those having a density of less than about any of the following: 0.925, 0.922, 0.92, 0.917, 0.915, 0.912, 0.91, 0.907, 0.905, 0.903, 0.9, and 0.898 grams/cubic centimeter. Unless otherwise indicated, all densities herein are measured according to ASTM D1505.

The polyethylene polymers may be either heterogeneous or homogeneous. As is known in the art, heterogeneous polymers have a relatively wide variation in molecular weight and composition distribution. Heterogeneous polymers may be prepared with, for example, conventional Ziegler-Natta catalysts.

On the other hand, homogeneous polymers are typically prepared using metallocene or other single-site catalysts. Such single-site catalysts typically have only one type of catalytic site, which is believed to be the basis for the homogeneity of the polymers resulting from the polymerization. Homogeneous polymers are structurally different from heterogeneous polymers in that homogeneous polymers exhibit a relatively even sequencing of comonomers within a chain, a mirroring of sequence distribution in all chains, and a similarity of length of all chains. As a result, homogeneous polymers have relatively narrow molecular weight and composition distributions. Examples of homogeneous polymers include the metallocene-catalyzed linear homogeneous ethylene/alpha-olefin copolymer resins available from the Exxon Chemical Company (Baytown, Tex.) under the EXACT trademark, linear homogeneous ethylene/alpha-olefin copolymer resins available from the Mitsui Petrochemical Corporation under the TAFMER trademark, and long-chain branched, metallocene-catalyzed homogeneous ethylene/alpha-olefin copolymer resins available from the Dow Chemical Company under the AFFINITY trademark.

Another useful ethylene copolymer is ethylene/unsaturated ester copolymer, which is the copolymer of ethylene and one or more unsaturated ester monomers. Useful unsaturated esters include: 1) vinyl esters of aliphatic carboxylic acids, where the esters have from 4 to 12 carbon atoms, and 2) alkyl esters of acrylic or methacrylic acid (collectively, "alkyl (meth)acrylate"), where the esters have from 4 to 12 carbon atoms.

Representative examples of the first ("vinyl ester") group of monomers include vinyl acetate, vinyl propionate, vinyl hexanoate, and vinyl 2-ethylhexanoate. The vinyl ester monomer may have from 4 to 8 carbon atoms, from 4 to 6 carbon atoms, from 4 to 5 carbon atoms, and preferably 4 carbon atoms.

Representative examples of the second ("alkyl (meth) acrylate") group of monomers include methyl acrylate, ethyl acrylate, isobutyl acrylate, n-butyl acrylate, hexyl acrylate, and 2-ethylhexyl acrylate, methyl methacrylate, ethyl methacrylate, isobutyl methacrylate, n-butyl methacrylate, hexyl methacrylate, and 2-ethylhexyl methacrylate. The alkyl (meth)acrylate monomer may have from 4 to 8 carbon atoms, from 4 to 6 carbon atoms, and preferably from 4 to 5 carbon atoms.

The unsaturated ester (i.e., vinyl ester or alkyl (meth) acrylate) comonomer content of the ethylene/unsaturated ester copolymer may range from about 6 to about 18 weight %, and from about 8 to about 12 weight %, based on the weight of the copolymer. Useful ethylene contents of the ethylene/unsaturated ester copolymer include the following amounts: at least about 82 weight %, at least about 85 weight %, at least about 88 weight %, no greater than about 94 weight %, no greater than about 93 weight %, and no greater than about 92 weight %, based on the weight of the copolymer.

Representative examples of ethylene/unsaturated ester copolymers include ethylene/methyl acrylate, ethylene/methyl, methacrylate, ethylene/ethyl acrylate, ethylene/ethyl methacrylate, ethylene/butyl acrylate, ethylene/2-ethylhexyl methacrylate, and ethylene/vinyl acetate.

Another useful ethylene copolymer is ethylene/(meth) acrylic acid, which is the copolymer of ethylene and acrylic acid, methacrylic acid, or both.

Useful propylene copolymer includes propylene/ethylene copolymers ("EPC"), which are copolymers of propylene and ethylene having a majority weight % content of propylene, such as those having an ethylene comonomer content of less than 10%, less than 6%, and at least about 2% by weight.

EVOH

Ethylene/vinyl alcohol copolymer ("EVOH") is another useful thermoplastic. EVOH may have an ethylene content of about 32%, or at least about any of the following values: 20%, 25%, and 30% by weight. EVOH may have an ethylene content of at most about any of the following values: 40%, 35%, and 33% by weight. EVOH may include saponified or hydrolyzed ethylene/vinyl acetate copolymers, such as those having a degree of hydrolysis of at least about any of the following values: 50% and 85%.

Ionomer

Another useful thermoplastic is ionomer, which is a copolymer of ethylene and an ethylenically unsaturated monocarboxylic acid having the carboxylic acid groups partially neutralized by a metal ion, such as sodium or zinc. Useful ionomers include those in which sufficient metal ion is present to neutralize from about 10% to about 60% of the acid groups in the ionomer. The carboxylic acid is preferably "(meth)acrylic acid"—which means acrylic acid and/or methacrylic acid. Useful ionomers include those having at least 50 weight % and preferably at least 80 weight % ethylene units. Useful ionomers also include those having from 1 to 20 weight percent acid units. Useful ionomers are available, for example, from Dupont Corporation (Wilmington, Del.) under the SURLYN trademark.

Vinyl Plastics

Useful vinyl plastics include polyvinyl chloride ("PVC"), vinylidene chloride polymer ("PVdC"), and polyvinyl alcohol ("PVOH"). Polyvinyl chloride ("PVC") refers to a vinyl chloride-containing polymer or copolymer—that is, a polymer that includes at least 50 weight percent monomer units derived from vinyl chloride ($CH_2=CHCl$) and also, optionally, one or more comonomer units, for example, derived from vinyl acetate. One or more plasticizers may be compounded with PVC to soften the resin and/or enhance flexibility and processability. Useful plasticizers for this purpose are known in the art.

Another exemplary vinyl plastic is vinylidene chloride polymer ("PVdC"), which refers to a vinylidene chloride-containing polymer or copolymer—that is, a polymer that includes monomer units derived from vinylidene chloride ($CH_2=CCl_2$) and also, optionally, monomer units derived from one or more of vinyl chloride, styrene, vinyl acetate, acrylonitrile, and $C_1$—$C_{12}$ alkyl esters of (meth)acrylic acid (e.g., methyl acrylate, butyl acrylate, methyl methacrylate). As used herein, "(meth)acrylic acid" refers to both acrylic acid and/or methacrylic acid; and "(meth)acrylate" refers to both acrylate and methacrylate. Examples of PVdC include one or more of the following: vinylidene chloride homopolymer, vinylidene chloride/vinyl chloride copolymer ("VDC/VC"), vinylidene chloride/methyl acrylate copolymer, vinylidene chloride/ethyl acrylate copolymer, vinylidene chloride/ethyl methacrylate copolymer, vinylidene chloride/methyl methacrylate copolymer, vinylidene chloride/butyl acrylate copolymer, vinylidene chloride/styrene copolymer, vinylidene chloride/acrylonitrile copolymer, and vinylidene chloride/vinyl acetate copolymer.

Useful PVdC includes that having at least about 75, at most about 95, and at most about 98 weight % vinylidene chloride monomer. Useful PVdC (for example, as applied by latex emulsion coating) includes that having at least about any of 5%, 10%, and 15%—and/or at most about any of 25%, 22%, 20%, and 15 weight %—comonomer with the vinylidene chloride monomer.

Useful PVdC includes that having a weight-average molecular weight ($M_w$) of at least about any of the following 10,000; 50,000; 80,000; 90,000; 100,000; 111,000; 120,000; 150,000; and 180,000; and at most about any of the following: 180,000, 170,000; 160,000; 150,000; 140,000; 100,000; and 50,000. Useful PVdC also includes that having a viscosity-average molecular weight ($M_z$) of at least about any of the following: 130,000; 150,000; 170,000; 200,000; 250,000; and 300,000; and at most about any of the following: 300,000; 270,000; 250,000; and 240,000.

A layer that includes PVdC may also include a thermal stabilizer (e.g., a hydrogen chloride scavenger such as epoxidized soybean oil) and a lubricating processing aid (e.g., one or more acrylates).

Polyamide

Useful polyamides include those of the type that may be formed by the polycondensation of one or more diamines with one or more diacids and/or of the type that may be formed by the polycondensation of one or more amino acids. Useful polyamides include aliphatic polyamides and aliphatic/aromatic polyamides.

Representative aliphatic diamines for making polyamides include those having the formula:

where n has an integer value of 1 to 16. Representative examples include trimethylenediamine, tetramethylenediamine, pentamethylenediamine, hexamethylenediamine, octamethylenediamine, decamethylenediamine, dodecamethylenediamine, hexadecamethylenediamine. Representative aromatic diamines include p-phenylenediamine, 4,4'-diaminodiphenyl ether, 4,4' diaminodiphenyl sulphone, 4,4'-diaminodiphenylethane. Representative alkylated diamines include 2,2-dimethylpentamethylenediamine, 2,2,4- trimethylhexamethylenediamine, and 2,4,4 trimethylpentamethylenediamine. Representative cycloaliphatic diamines include diaminodicyclohexylmethane. Other useful diamines include heptamethylenediamine, nonamethylenediamine, and the like.

Representative diacids for making polyamides include dicarboxylic acids, which may be represented by the general formula:

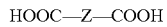

where Z is representative of a divalent aliphatic or cyclic radical containing at least 2 carbon atoms. Representative examples include aliphatic dicarboxylic acids, such as adipic acid, sebacic acid, octadecanedioic acid, pimelic acid, suberic acid, azelaic acid, dodecanedioic acid, and glutaric acid; and aromatic dicarboxylic acids, such as such as isophthalic acid and terephthalic acid.

The polycondensation reaction product of one or more of the above diamines with one or more of the above diacids may form useful polyamides. Representative polyamides of the type that may be formed by the polycondensation of one or more diamines with one or more diacids include aliphatic polyamides such as poly(hexamethylene adipamide) ("nylon-6,6"), poly(hexamethylene sebacamide) ("nylon-6,10"), poly(heptamethylene pimelamide) ("nylon-7,7"), poly(octamethylene suberamide) ("nylon-8,8"), poly(hexamethylene azelamide) ("nylon-6,9"), poly(nonamethylene azelamide) ("nylon-9,9"), poly(decamethylene azelamide) ("nylon-10,9"), poly(tetramethylenediamine-co-oxalic acid) ("nylon-4,2"), the polyamide of n-dodecanedioic acid and hexamethylenediamine ("nylon-6,12"), the polyamide of dodecamethylenediamine and n-dodecanedioic acid ("nylon-12,12").

Representative aliphatic/aromatic polyamides include poly(tetramethylenediamine-co-isophthalic acid) ("nylon-4, I"), polyhexamethylene isophthalamide ("nylon-6,I"), polyhexamethylene terephthalamide ("nylon-6,T"), poly (2,2,2-trimethyl hexamethylene terephthalamide), poly(m-xylylene adipamide) ("nylon-MXD,6"), poly(p-xylylene adipamide), poly(hexamethylene terephthalamide), poly (dodecamethylene terephthalamide), and polyamide-MXD, I.

Representative polyamides of the type that may be formed by the polycondensation of one or more amino acids include poly(4-aminobutyric acid) ("nylon-4"), poly(6-aminohexanoic acid) ("nylon-6" or "poly(caprolactam)"), poly(7-aminoheptanoic acid) ("nylon-7"), poly(8-aminooctanoic acid) ("nylon-8"), poly(9-aminononanoic acid) ("nylon-9"), poly(10-aminodecanoic acid) ("nylon-10"), poly(11-aminoundecanoic acid) ("nylon-11"), and poly(12-aminododecanoic acid) ("nylon-12").

Representative copolyamides include copolymers based on a combination of the monomers used to make any of the foregoing polyamides, such as, nylon-4/6, nylon-6/6, nylon-6/9, nylon-6/12, caprolactam/hexamethylene adipamide copolymer ("nylon-6,6/6"), hexamethylene adipamide/caprolactam copolymer ("nylon-6/6,6"), trimethylene adipamide/hexamethylene azelaiamide copolymer ("nylon-trimethyl 6,2/6,2"), hexamethylene adipamide-hexamethylene-azelaiamide caprolactam copolymer ("nylon-6,6/6,9/6"), hexamethylene adipamide/hexamethylene-isophthalamide ("nylon-6,6/6,I"), hexamethylene adipamide/hexamethyleneterephthalamide ("nylon-6,6/6,T"), nylon-6,T/6,I, nylon-6/MXD,T/MXD,I, nylon-6,6/6,10, and nylon-6,I/6,T.

Conventional nomenclature typically lists the major constituent of a copolymer before the slash ("/") in the name of a copolymer; however, in this application the constituent listed before the slash is not necessarily the major constituent unless specifically identified as such. For example, unless the application specifically notes to the contrary, "nylon-6/6,6" and "nylon-6,6/6" may be considered as referring to the same type of copolyamide.

Polyamide copolymers may include the most prevalent polymer unit in the copolymer (e.g., hexamethylene adipamide as a polymer unit in the copolymer nylon-6,6/6) in mole percentages ranging from any of the following: at least about 50%, at least about 60%, at least about 70%, at least about 80%, and at least about 90%, and the ranges between any of the forgoing values (e.g., from about 60 to about 80%); and may include the second most prevalent polymer unit in the copolymer (e.g., caprolactam as a polymer unit in the copolymer nylon-6,6/6) in mole percentages ranging from any of the following: less than about 50%, less than about 40%, less than about 30%, less than about 20%, less than about 10%, and the ranges between any of the forgoing values (e.g., from about 20 to about 40%).

Useful polyamides include those that are approved by the controlling regulating agency (e.g., the U.S. Food and Drug Agency) for either direct contact with food and/or for use in a food packaging film, at the desired conditions of use.

Polyesters

Useful polyesters include those made by: 1) condensation of polyfunctional carboxylic acids with polyfunctional alcohols, 2) polycondensation of hydroxycarboxylic acid, and 3) polymerization of cyclic esters (e.g., lactone).

Exemplary polyfunctional carboxylic acids (and their derivatives such as anhydrides or simple esters like methyl esters) include aromatic dicarboxylic acids and derivatives (e.g., terephthalic acid, isophthalic acid, dimethyl terephthalate, dimethyl isophthalate) and aliphatic dicarboxylic acids and derivatives (e.g., adipic acid, azelaic acid, sebacic acid, oxalic acid, succinic acid, glutaric acid, dodecanoic diacid, 1,4-cyclohexane dicarboxylic acid, dimethyl-1,4-cyclohexane dicarboxylate ester, dimethyl adipate). Useful dicarboxylic acids also include those discussed above in the polyamide section. As is known to those of skill in the art, polyesters may be produced using anhydrides and esters of polyfunctional carboxylic acids.

Exemplary polyfunctional alcohols include dihydric alcohols (and bisphenols) such as ethylene glycol, 1,2-propanediol, 1,3-propanediol, 1,3 butanediol, 1,4-butanediol, 1,4-cyclohexanedimethanol, 2,2-dimethyl-1,3-propanediol, 1,6-hexanediol, poly(tetrahydroxy-1,1'-biphenyl, 1,4-hydroquinone, and bisphenol A.

Exemplary hydroxycarboxylic acids and lactones include 4-hydroxybenzoic acid, 6-hydroxy-2-naphthoic acid, pivalolactone, and caprolactone.

Useful polyesters include homopolymers and copolymers. These may be derived from one or more of the constituents discussed above. Exemplary polyesters include poly(ethylene terephthalate) ("PET"), poly(butylene terephthalate) ("PBT"), and poly(ethylene naphthalate) ("PEN"). If the polyester includes a mer unit derived from terephthalic acid, then such mer content (mole %) of the diacid of the polyester may be at least about any the following: 70, 75, 80, 85, 90, and 95%.

The polyester may be thermoplastic. The polyester (e.g., copolyester) of the film may be amorphous, or may be partially crystalline (semi-crystalline), such as with a crystallinity of at least about, or at most about, any of the following weight percentages: 10, 15, 20, 25, 30, 35, 40, and 50%.

Film Thickness and Layers

The film may have any total thickness as long as it provides the desired properties (e.g., free shrink, shrink tension, flexibility, Young's modulus, optics, strength, barrier) for the given application of expected use. The film may have a thickness of less than about any of the following: 20 mils, 10 mils, 5 mils, 4 mils, 3 mils, 2 mils, 1.5 mils, 1.2 mils, and 1 mil. The film may also have a thickness of at least about any of the following: 0.25 mils, 0.3 mils, 0.35 mils, 0.4 mils, 0.45 mils, 0.5 mils, 0.6 mils, 0.75 mils, 0.8 mils, 0.9 mils, 1 mil, 1.2 mils, 1.4 mils, 1.5 mils, 2 mils, 3 mils, and 5 mils.

The film may be monolayer or multilayer. The film may comprise at least any of the following number of layers: 1, 2, 3, 4, and 5. The film may comprise at most any of the following number of layers: 20, 15, 10, 9, 7, 5, 3, 2, and 1. The term "layer" refers to a discrete film component which is coextensive with the film and has a substantially uniform composition. Any of the layers of the film may have a thickness of at least about any of the following: 0.05, 0.1, 0.2, 0.5, 1, 2, and 3 mil. Any of the layers of the film may have a thickness of at most about any of the following: 5, 2, 1, and 0.5 mils. Any of the layers of the film may have a thickness as a percentage of the total thickness of the film of at least about any of the following values: 1, 3, 5, 7, 10, 15, 20, 30, 40, 50, 60, 70, 80, and 90%. Any of the layers of the film may have a thickness as a percentage of the total thickness of the film of at most about any of the following values: 90, 80, 50, 40, 35, 30, 25, 20, 15, 10, and 5%.

The film may comprise one or more barrier layers, one or more tie layers, one or more heat seal layers, an outside layer, an inside layer, a shrink layer, one or more abuse layers, and one or more bulk or core layers. Below are some examples of combinations in which the alphabetical symbols designate the layers. Where the film representation below includes the same letter more than once, each occurrence of the letter may represent the same composition or a different composition within the class that performs a similar function. C/D, E, D/E, C/E, C/D/E, C/D/D/E, C/A/E, C/A/E, C/B/A/E, C/B/A/B/E, C/B/A/B/D/E, C/B/A, C/A, A/E, E/B/A, C/D/B/A, E/A/E, A/B/D/E, C/B/A/B/C, C/B/A/B/E, C/B/A/B/D/E, C/D/B/A/B/E, C/D/B/A/B/D/E, C/B/A/B/C, C/B/A/B/E, C/D/B/A/B/D/E, C/D/B/A/B/E, C/D/B/A/B/D/E "A" is a barrier layer, as discussed below.

"B" is a tie layer, as discussed below.

"C" is a heat seal layer (i.e., sealant layer), that is, a layer adapted to facilitate the heat-sealing of the film to itself or to another object, such as a substrate, as is known in the art.

"D" may be a core layer, a bulk layer, or a shrink layer. The term "shrink layer" refers to a shrink controlling layer that initiates compatible shrinkage of the overall multilayer film structure. The relative thickness of the shrink layer is selected as being sufficient relative to that of the overall film thickness such that the shrink temperature of the shrink layer essentially controls the shrinkage of the entire multilayer film.

"E" is an outside (i.e., abuse or print side) layer.

Useful films that may be modified to incorporate SWNT material as set forth in this Application are described in the following: U.S. Pat. No. 4,514,465 to Schoenberg; U.S. Pat. No. 4,532,189 to Mueller; U.S. Pat. No. 4,551,380 to Schoenberg; U.S. Pat. No. 4,590,124 to Schoenberg; U.S. Pat. No. 4,643,943 to Schoenberg; U.S. Pat. No. 4,724,185 to Shah; U.S. Pat. No. 4,726,984 to Shah; U.S. Pat. No. 4,755,419 to Shah; U.S. Pat. No. 5,023,143 to Nelson; U.S. Pat. No. 5,658,625 to Bradfute et al; U.S. Pat. No. 5,543,223 to Shah; U.S. Pat. No. 5,897,941 to Shah; U.S. Pat. No. 6,296,947 to Shah; U.S. Pat. No. 6,423,421 to Banaszak et al; U.S. Pat. No. 6,479,138 to Childress; and U.S. Pat. No. 6,579,621 to Shah; each of which is incorporated herein in its entirety by reference.

Barrier Layer

The film may comprise one or more barrier polymers. A "barrier polymer" is a polymer that may markedly decrease the transmission rate of a specified gas through a film incorporating the polymer, relative to a comparable film not incorporating the polymer. Thus, the barrier polymer for a specified gas imparts enhanced barrier attributes to the film relative to the specified gas. When the term "barrier polymer" is used in this application without reference to a specified gas, it is understood that the term may be in reference to any of water vapor, oxygen, and/or carbon dioxide gases.

For example, an "oxygen barrier polymer" may markedly decrease the oxygen gas transmission rate through a film incorporating the oxygen barrier polymer, because the oxygen barrier polymer imparts enhanced oxygen barrier attributes to the film. If the barrier polymer is effective for water vapor, then the barrier polymer may be considered a "water vapor barrier polymer." A barrier polymer that is effective as a barrier for one type of gas may also be effective as a barrier to one or more other gases. For example, a barrier polymer that is effective for oxygen may also be effective for carbon dioxide, such that the same polymer may be considered an oxygen barrier polymer and a carbon dioxide barrier polymer.

If the film is multilayered, then the one or more layers of the film that incorporate one or more barrier polymers in an amount sufficient to notably decrease the transmission rate of a specified gas through the film may be considered "barrier layers" with respect to the specified gas. If the film is monolayer and incorporates one or more barrier polymers, then the monolayer film itself may be considered a "barrier layer." For example, if a layer comprises an oxygen barrier polymer, then the layer may be considered an oxygen barrier layer.

The film or a barrier layer of the film may comprise one or more barrier polymers in an amount of at least about, or less than about, any of the following: 10%, 20%, 30%, 40%, 50%, 60%, 70%, 80%, 90%, 95%, 97%, 98%, 99%, and 99.5%, based on the weight of the film or the barrier layer, respectively.

Exemplary oxygen barrier polymers include: EVOH, PVOH, PVdC, polyalkylene carbonate, polyester (e.g., PET, PEN), polyacrylonitrile ("PAN"), and polyamide. Several of these polymers were discussed above in more detail.

Tie Layer

A tie layer (e.g., a second layer) is a layer directly adhered (i.e., directly adjacent) to first and third layers, and has the primary function of improving the adherence of the first layer to the third layer. For example, the film may include one or two tie layers directly adhered to a barrier layer and/or one or two tie layers directly adhered to a layer comprising SWNT material.

A tie layer may comprise one or more polymers having grafted polar groups so that the polymer is capable of enhanced bonding to polar polymers such as EVOH. Useful polymers for tie layers include ethylene/unsaturated acid copolymer, ethylene/unsaturated ester copolymer, anhydride-modified polyolefin, polyurethane, and mixtures thereof. Further exemplary polymers for tie layers include one or more of the polyamides previously discussed; ethylene/vinyl acetate copolymer having a vinyl acetate content of at least about any of the following: 3, 6, and 15 weight %; ethylene/methyl acrylate copolymer having a methyl acrylate content of at least about 20 weight %; anhydride-modified ethylene/methyl acrylate copolymer having a methyl acrylate content of at least about any of the following: 5, 10, 15, and 20 weight %; and anhydride-modified ethylene/alpha-olefin copolymer, such as an anhydride grafted LLDPE.

Modified polymers or anhydride-modified polymers include polymers prepared by copolymerizing an unsaturated carboxylic acid (e.g., maleic acid, fumaric acid), or a derivative such as the anhydride, ester, or metal salt of the unsaturated carboxylic acid with—or otherwise incorporating the same into—an olefin homopolymer or copolymer. Thus, anhydride-modified polymers have an anhydride functionality achieved by grafting or copolymerization.

Single-Walled Nanotube Material

The film comprises single-walled carbon nanotube ("SWNT") material. SWNT material comprises at least one type of SWNTs. SWNT material may comprise any of two, at least two, three, at least three, four, and at least four types of SWNTs. A SWNT comprises a hollow carbon fiber having essentially a single layer of carbon atoms forming the wall of the fiber. A SWNT may be considered as comprising a single-layered graphene sheet. A SWNT comprises a crystalline tubular form of carbon that is related to the $C_{60}$ molecules known as "fullerenes." SWNT material may also be referred to as "fullerene pipes" (see Science, 1998, vol. 280, page 1254) or "carbon single tubes" (see Japanese Unexamined Patent Application, First Publication, No. Hei 8-91816).

The average diameter of the SWNT material may be at most about any of the following: 50, 40, 30, 20, 10, 5, 3, 2, and 1 nm; and may be at least about any of the following: 0.8, 1, 2, 3, 5, 10, 15, and 20 nm. The ratio of average tube length of SWNT material to the average diameter of the SWNT material may be at least about any of the following: 3, 5, 8, 10, 20, 100, 500, 1,000, 5,000, and 10,000; and may be at most about any of the following: 5, 8, 10, 20, 100, 500, 1,000, 5,000, 10,000, and 20,000.

SWNT material, and methods of making SWNTs, are known in the art. See, for example, U.S. Pat. Nos. 5,424,054; 5,753,088; 6,063,243; 6,331,209; 6,333,016; 6,413,487; 6,426,134; 6,451,175; 6,455,021; 6,517,800; U.S. Patent Publication 2002/0122765 A1; Iijima et al., Nature, Vol. 363, p. 603 (1993); D. S. Bethune et al., Nature 63 (1993) 060; R. Smalley et al, Chem. Phys. Letters, Vol. 243 (1995) 49-54; and Science Vol. 273 (1996) 483-487; each of which is incorporated herein in its entirety by reference.

At least a portion of SWNT material may be functionalized (e.g., derivatized), for example, functionalized with PVOH- or EVOH-containing copolymers. See, for example, Yi Lin et al, "Polymeric Carbon Nanocomposites from Carbon Nanotubes Functionalized with Matrix Polymer," Macromolecules, vol. 36, No. 19, pp. 7199-7204 (August 2003), which is incorporated herein in its entirety by reference. A functionalized SWNT may be chemically bonded to or within one or more chains of a polymer. (See, e.g., U.S. Pat. No. 6,426,134.) For example, a functionalized SWNT may bear a carboxyl group at one end that can serve as a chain-terminating group of a polymer chain, or may bear carboxyl groups at both ends, and through copolymerization may reside at the end of or within a polymer chain. A functionalized SWNT may reside at the end of polymer chains, within the polymer chains, or both.

The SWNT material may be dispersed in the film, for example, so that the SWNT material is evenly dispersed throughout the film. Alternatively, one or more layers of the film may comprise SWNT material (e.g., dispersed in one or more layers of the film such as a shrink layer); one or more other layers of the film may be essentially devoid of SWNT material (e.g., all layers other than the shrink layer may be essentially devoid of SWNT material). Any of the above discussed layers may comprise SWNT material, or may be essentially devoid of SWNT material.

For example, at least about, and/or at most about, any of the following numbers of film layers may comprise SWNT material: 2, 3, 4, 5, 6, 7, 8, 9, 10, and 11. Also by way of example, at least about, and/or at most about, any of the following numbers of film layers may be essentially devoid of SWNT material: 2, 3, 4, 5, 6, 7, 8, 9, 10, and 11.

The film or a layer of the film may comprise at least about any of the following amounts of SWNT material: 0.001%, 0.005%, 0.01%, 0.05%, 0.1%, 0.5%, 1%, 1.5%, 2%, 2.5 %, 3%, 4%, 5%, 8%, 10%, 12%, 15%, 20%, 25%, 30%, 35%, and 40% based on the weight of the film or the weight of the layer incorporating the SWNT material. The film or a layer of the film may comprise at most about any of the following amounts of SWNT material: 50%, 40%, 30%, 20%, 15%, 10%, 8%, 6%, 5%, 4%, 3%, 2%, 1%, 0.5%, 0.1%, 0.05%, and 0.01% based on the weight of the film or the weight of the layer.

In one embodiment, film 10 (FIG. 1), which comprises outer layer 12 and one or more other layers 14, may comprise SWNT material by incorporating SWNT in one or more selected regions of the film, such as one or more discontinuous regions 16 supported by the outer layer 12 of film 10, in which case the one or more discontinuous regions 16 may form at least a portion of the outer surface 18 of film 10.

Figure 2:
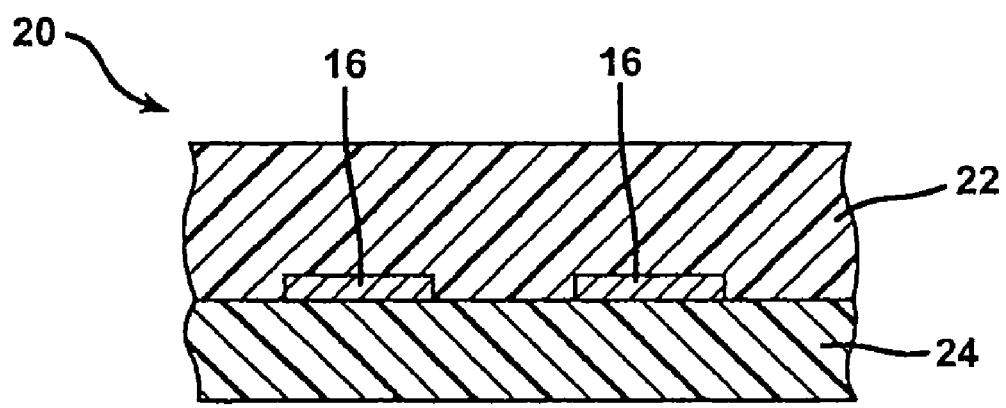
FIG. 2 is a representational cross-section of a film of another embodiment of the invention.

In another embodiment, film 20 (FIG. 2), which comprises one or more layers 22 and one or more other layers 24, may comprise SWNT material by incorporating SWNT in one or more selected regions of the film, such as one or more discontinuous regions 16 internal to the film structure (e.g., between layers 22 and 24).

In either embodiment, the one or more discontinuous regions 16 may comprise any of the percentages of SWNT material mentioned above (but in relation to the weight of the one or more discontinuous regions). The one or more discontinuous regions 16 may comprise polymer (e.g., thermoplastic polymer), such as one or more of any of the polymers described in this application in any of the percentage amounts described in this application (but in relation to the weight of the one or more discontinuous regions). The one or more discontinuous regions 16 may comprise one or more printing inks or varnishes.

The one or more discontinuous regions 16 may be in the shape of a dot, a strip, or other arrangement to form a desired area shape on the surface 18 of the film outer layer 12. The one or more discontinuous regions 16 may be deposited onto the film outer layer, for example, by "printing" (i.e., using a print application method) to apply a mixture comprising polymer resin and SWNT material onto the film outer layer in one or more selected regions. Useful printing methods for applying the mixture include one or more of printing methods known to those of skill in the art, such as screen, gravure, flexographic, roll, metering rod coating, ink-jet, digital, and toner print techniques.

Discontinuous regions 16 that have been deposited on an outer layer may subsequently become internal to the film structure by laminating or otherwise depositing one or more additional film layers over the discontinuous regions that incorporate SWNT. For example, just as a printed image may be "trap printed" by laminating a film over the printed image, so too can discontinuous regions 16 be trapped by an outer film layer.

The discontinuous regions 16 incorporating SWNT material may take the form of one or more bands (e.g., "stripes" or "lanes") of polymeric resin, as described in U.S. Pat. No. 5,110,530 to Havens, which is incorporated herein in its entirety by reference. Such bands may incorporate the dispersed SWNT rather than or in addition to pigment. Such bands may also be internal or external to the film layer structure.

A layer of the film may comprise at least about any of the following amounts of SWNT material based on the total amount of SWNT material in the film: 50, 60, 70, 80, 90, 95, 99 weight %. A layer of the film comprising any of the foregoing amounts of SWNT material may also have a thickness of at least about, and/or at most about, any of the following percentages based on the total thickness of the film: 90, 80, 70, 60, 50, 40, 30, 20, 15, 10, and 5%.

A layer comprising SWNT material may be an outer layer of the film. An outer layer may be an "outside layer" of the film (i.e., an outer layer adapted or designed to face to the outside of a package incorporating the film) or an "inside layer" of the film (i.e., an outer layer adapted or designed to face the inside of a package incorporating the film). If the film comprises only one layer, then the one layer may be considered an "outer layer." A layer comprising SWNT material may be an inner or interior layer of the film. An inner or interior layer of the film is between two outer layers of the film.

Additives

One or more layers of the film may include one or more additives useful in thermoplastic films, such as, antiblocking agents, slip agents, antifog agents, colorants, pigments, dyes, flavorants, antimicrobial agents, meat preservatives, antioxidants, fillers, radiation stabilizers, and antistatic agents. Such additives, and their effective amounts, are known in the art.

Modulus of the Film

The film preferably exhibits a Young's modulus sufficient to withstand the expected handling and use conditions. Young's modulus may be measured in accordance with one or more of the following ASTM procedures: D882; D5026-95a; D4065-89, each of which is incorporated herein in its entirety by reference. The film may have a Young's modulus—measured either before and/or after the exposing step discussed below—of at least about—or at most about—any of the following: 10,000; 15,000; 25,000; 40,000; 70,000; 80,000; 90,000; 100,000; 150,000; 200,000; 250,000; 300,000; and 350,000 pounds/square inch, measured at a temperature of 73° F. Useful ranges for Young's modulus for the film include from about 10,000 to about 300,000 psi, from about 15,000 to about 150,000 psi, and from about 15,000 to about 70,000 psi, measured at a temperature of 212° F.

Appearance Characteristics of the Film

The film may have low haze characteristics. Haze is a measurement of the transmitted light scattered more than 2.5° from the axis of the incident light. Haze is measured against the outside layer of the film. As previously discussed, the "outside layer" is the outer layer of the film that will be adjacent the area outside of a package comprising the film. Haze is measured according to the method of ASTM D 1003, which is incorporated herein in its entirety by reference. All references to "haze" values in this application are by this standard. The haze of the film—measured either before and/or after the exposing step discussed below—may be at most about any of the following values: 30%, 25%, 20%, 15%, 10%, 8%, 5%, and 3%.

The film may have a gloss as measured against the outside layer—measured either before and/or after the exposing step discussed below—of at least about any of the following values: 40%, 50%, 60%, 63%, 65%, 70%, 75%, 80%, 85%, 90%, and 95%. These percentages represent the ratio of light reflected from the sample to the original amount of light striking the sample at the designated angle. All references to "gloss" values in this application are in accordance with ASTM D 2457 (60° angle), which is incorporated herein in its entirety by reference.

The film may be transparent (at least in the non-printed regions) so that a packaged article may be visible through the film. "Transparent" means that the film transmits incident light with negligible scattering and little absorption, enabling objects (e.g., the packaged article or print) to be seen clearly through the film under typical viewing conditions (i.e., the expected use conditions of the material). The average transparency (i.e., clarity) of the film—measured either before and/or after the exposing step discussed below—may be at least about any of the following values: 65%, 70%, 75%, 80%, 85%, and 90%, as measured in accordance with ASTM D1746.

The measurement of optical properties of plastic films, including the measurement of total transmission, haze, clarity, and gloss, is discussed in detail in Pike, LeRoy, "Optical Properties of Packaging Materials," Journal of Plastic Film & Sheeting, vol. 9, no. 3, pp. 173-80 (July 1993), of which pages 173-80 is incorporated herein by reference.

Heat-Shrink Characteristic

The film may be heat shrinkable (i.e., has a shrink characteristic), which as used herein, means that the film has a free shrink at 185° F. (85° C.) in at least one direction of at least about 5% at 185° F. For example, the film may have a free shrink at 185° F. (85° C.) in either of the machine or transverse directions (or both directions) of at least about, and/or at most about, any of the following: 7%, 10%, 15%, 25%, 30%, 40%, 45%, 50%, 55%, 60%, 70%, and 80%. Further, the film may have any of the preceding free shrink values measured at a temperature selected from any of 200° F., 220° F., 240° F., 260° F., and 280° F.

The film may have unequal free shrink in both directions, that is differing free shrink in the machine and transverse directions. For example, the film may have a free shrink (185° F.) in the machine direction of at least 40% and a free shrink (185° F.) in the transverse direction of at least 25%. The film may not have a heat shrink characteristic in both directions. For example, the film may have a free shrink at 185° F. in one direction of less than about any of the following: 5%, 4%, 3%, 2% and 1%; or the film may have 0% free shrink at 185° F. in one direction. The free shrink of the film is determined by measuring the percent dimensional change in a 10 cm×10 cm film specimen when subjected to selected heat (i.e., at a specified temperature exposure) according to ASTM D 2732, which is incorporated herein in its entirety by reference. All references to free shrink in this application are measured according to this standard.

As is known in the art, a heat-shrinkable film shrinks upon the application of heat while the film is in an unrestrained state. If the film is restrained from shrinking to some extent—for example by a packaged product around which the film shrinks—then the tension of the heat-shrinkable film increases upon the application of heat. Accordingly, a heat-shrinkable film that has been exposed to heat so that at least a portion of the film is either reduced in size (unrestrained) or under increased tension (restrained) is considered a heat-shrunk (i.e., heat-contracted) film.

The film may exhibit a shrink tension at 185° F. in at least one direction of at least about, and/or at most about, any of the following: 100 psi, 150 psi, 175 psi, 200 psi, 225 psi, 250 psi, 275 psi, 300 psi, 325 psi, 350 psi, 400 psi, 450 psi, 500 psi, 550 psi, and 600 psi. Further, the film may have any of the preceding shrink tensions measured at a temperature selected from any of 200° F., 220° F., 240° F., 260° F., and 280° F. The film may have unequal shrink tension in both directions, that is differing shrink tension in the machine and transverse directions. The film may not have a shrink tension in one or both directions. Shrink tension is measured at a specified temperature (e.g., 185° F.) in accordance with ASTM D 2838 (Procedure A), which is incorporated herein in its entirety by reference. All references to shrink tension in this application are by this standard.

The film may be annealed or heat-set to reduce the free shrink slightly or substantially; or the film may not be heat set or annealed once the oriented film has been quenched in order that the film will have a high level of heat shrinkability.

Manufacturing the Film

The film may be manufactured by thermoplastic film-forming processes known in the art. The film may be prepared by extrusion or coextrusion utilizing, for example, a tubular trapped bubble film process or a flat film (i.e., cast film or slit die) process. The film may also be prepared by applying one or more layers by extrusion coating, adhesive lamination, extrusion lamination, solvent-borne coating, or by latex coating (e.g., spread out and dried on a substrate). A combination of these processes may also be employed. These processes are known to those of skill in the art.

In forming the resin mixture for the one or more film layers that comprise the SWNT material, the SWNT material may be mixed with polymer before the resin mixture is heated or melted for processing to form the film. This may help to disperse the SWNT in the polymer. Once mixed, the blend can be extruded and processed as discussed above.

The film may be oriented in either the machine (i.e., longitudinal), the transverse direction, or in both directions (i.e., biaxially oriented), for example, to enhance the strength, optics, and durability of the film. A web or tube of the film may be uniaxially or biaxially oriented by imposing a draw force at a temperature where the film is softened (e.g., above the vicat softening point; see ASTM 1525) but at a temperature below the film's melting point. The film may then be quickly cooled to retain the physical properties generated during orientation and to provide a heat-shrink characteristic to the film. The film may be oriented using, for example, a tenter-frame process or a bubble process. These processes are known to those of skill in the art, and therefore are not discussed in detail here. The orientation may occur in at least one direction by at least about, and/or at most about, any of the following ratios: 1.5:1, 2:1, 2.5:1, 3:1, 3.5:1, 4:1, 5:1, 6:1, 7:1, 8:1, 9:1, 10:1, 12:1, and 15:1.

Optional Energy Treatment

One or more of the layers of the film—or at least a portion of the entire film—may be cross-linked, for example, to improve the strength of the film. Cross-linking may be achieved by using chemical additives or by subjecting one or more film layers to one or more energetic radiation treatments—such as ultraviolet, X-ray, gamma ray, beta ray, and high energy electron beam treatment—to induce cross-linking between molecules of the irradiated material. Useful radiation dosages include at least about any of the following: 5, 7, 10, 15, 20, 25, 30, 35, 40, 45, and 50 kGy (kiloGray). Useful radiation dosages include less than about any of the following: 150, 130, 120, 110, 100, 90, 80, and 70 kGy. The dosage of the radiation utilized for crosslinking may be achieved by a sufficiently low intensity or over a sufficiently long duration such that the SWNT material is not significantly structurally disrupted. The cross-linking may occur before the orientation process, for example, to enhance the film strength before orientation, or the cross-linking may occur after the orientation process.

It may be desirable to avoid irradiating a film layer comprising PVdC or a film layer comprising SWNT. To that end, substrate layers may be extruded and irradiated, and the PVdC-containing layer and/or the SWNT-containing layer (and subsequent layers) may then be applied to the irradiated substrate, for example, by an extrusion coating process.

All or a portion of one or two surfaces the film may be corona and/or plasma treated to change the surface energy of the film, for example, to increase the ability of print or a food product to adhere to the film. One type of oxidative surface treatment involves bringing the sealant film into the proximity of an $O_2$- or $N_2$-containing gas (e.g., ambient air) which has been ionized. Exemplary techniques are described in, for example, U.S. Pat. No. 4,120,716 (Bonet) and U.S. Pat. No. 4,879,430 (Hoffman), which are incorporated herein in their entirety by reference. The film may be treated to have a surface energy of at least about 0.034 $J/m^2$, preferably at least about 0.036 J/m², more preferably at least about 0.038 J/m², and most preferably at least about 0.040 J/m².

Shrinking the Film

The film comprising SWNT material may be exposed to an amount of radiation energy effective to activate the shrink characteristic of the film. As used herein, "activate the shrink characteristic of the film" means that the free shrink of the exposed film in at least one direction measured at 185° F. is at least about 5% less than the free shrink at 185° F. of the film measured in the same direction before the exposure. For example of an exposure to activate the shrink characteristic of a film, if the free shrink at 185° F. in the machine direction is 20% before an exposure, and if the free shrink at 185° F. in the machine direction of the film after an exposure is 19%, then the free shrink of the film after the exposure is 5% less than the free shrink of the film before the exposure. This is calculated by (20%−19%)/20%=5%.

The free shrink of the film exposed to the effective amount of radiation measured in at least one direction at 185° F. may be at least about any of the following values less than the free shrink at 185° F. of the film measured in the same direction before the exposure: 5%, 10%, 20%, 30%, 40%, 50%, 60%, 70%, 80%, 90%, 95%, and 100%. Further, any of the percentage differences listed in the preceding sentence for the before and after exposure measurements may occur when the free shrink is measured at any of the following temperatures: 200° F., 220° F., 240° F., 260° F., and 280° F.

The shrink tension of the film exposed to the effective amount of radiation measured in at least one direction at 185° F. may be at least about any of the following values less than the shrink tension at 185° F. of the film measured in the same direction before the exposure: 5%, 10%, 20%, 30%, 40%, 50%, 60%, 70%, 80%, 90%, 95%, and 100%. Further, any of the percentage differences listed in the preceding sentence for the before and after exposure measurements may occur when the shrink tension is measured at any of the following temperatures: 200° F., 220° F., 240° F., 260° F., and 280° F.

The effective amount of radiation energy may comprise, consist of, or consist essentially of non-ionizing radiation, such as one or more of any of the following: visible light, infrared light, ultraviolet light (e.g., UVA, UVB, and/or UVC), microwave, and radiowave. The effective amount of radiation energy may comprise at least about any of the following amounts—50%, 60%, 70%, 80%, 90%, and 95%—of any one, or any combination of one or more, of the types of radiation energy previously listed. For example, the effective amount of radiation energy may comprise at least about 50% visible light energy; or the effective amount of non-ionizing radiation may comprise at least about 80% UV light. The effective amount of radiation energy may be essentially devoid of one or more of any of the types of radiation energy previously listed. For example, the effective amount of radiation energy may be essentially devoid of radiowave.

The radiation energy amount (e.g., the surface dosage for non-ionizing radiation) of the exposing step may be delivered within a duration of at most about any of the following: 30, 25, 20, 15, 10, 9, 8, 7, 6, 5, 4, 3, 2, 1, 0.5, 0.1, 0.05, 0.01, 0.005, and 0.001 seconds; and 500, 150, 130, 110, 100, 90, 80, 70, 60, and 50 microseconds. The radiation energy amount (e.g., the surface dosage) of the exposing step may be delivered within a duration of at least about any of the following: 10, 20, 30, 40, 50, 60, 70, 80, 90, 100, 150, and 500 microseconds; and 0.001, 0.005, 0.01, 0.05, 0.1, 0.5, 1, 2, 3, 4, 5, 6, 7, 8, 9, 10, 15, 20, and 25 seconds. The delivery of the radiation amount may be substantially continuous during the duration time period, or may occur in a discontinuous manner over the duration time period, for example by any of at least one, at least two, at least three, and at least four pulses of radiation, such as a series of pulses of radiation.

If multiple pulses of radiation are used, then it may be beneficial for the intervals between the pulses of radiation energy to be short enough so that the multiple pulses may have cumulative effect. An individual pulse of radiation may have a duration of at least about any of the following values: 10, 20, 30, 40, 50, 60, 70, 80, 90, 100, 200, 300, 400, and 500 microseconds. An individual pulse of radiation may have a duration of at most about any of the following values: 900, 700, 500, 300, 150, 130, 110, 100, 90, 80, 70, 60, and 50 microseconds.

The duration discussed above may also be considered a residence time for a portion of the film that is in the exposure zone of a radiation delivery device, for example, where the film is in the form of a continuous web that travels beneath a radiation delivery device, which may be continuously irradiating that portion of the web that travels through the radiation exposure zone.

For non-ionizing radiation, the effective amount of radiation energy to shrink the film may be considered a function of the radiation intensity (i.e., the rate of radiation energy flow per unit area) and the duration of the radiation exposure, to achieve an effective surface dose (i.e., the radiation energy per unit area at the surface of the film). The relationship between these factors may be illustrated by the following equation: (intensity)×(duration)=surface dose.

The radiation energy exposure step may comprise a non-ionizing radiation intensity (measured at the surface of the film) of at least about any of the following: 10, 30, 50, 80, 100, 150, 200, 250, 300, 400, 500, 800, 1,000, 1,200, 1,500, and 1,800 mW/cm2; and at most about any of the following: 2,000, 1,800, 1,500, 1,200, 1,000, 800, 500, 450, 400, 350, 300, 250, 200, 150, and 100 mW/cm2. Any of these intensities may occur during one or more pulses of radiation, if the radiation energy is delivered in a discontinuous manner.

Effective amounts of non-ionizing radiation energy (measured at the surface of the film) of the exposing step delivered during any of the durations discussed above may include at least about any of the following surface doses: 0.01, 0.05, 0.1, 0.5, 1, 5, 10, 20, 50, 100, 500, 1,000, 5,000, 10,000, and 20,000 mJ/cm2 (i.e., milli-Joules/cm2); and may include at most about any of the following surface doses: 0.05, 0.1, 0.5, 1, 5, 10, 20, 50, 100, 500, 1,000, 5,000, 10,000, 20,000, 50,000, and 60,000 mJ/cm2.

The effective amount of radiation energy may be essentially devoid of microwave energy in the 2.54 nm wavelength range in order to avoid exciting (heating). water or water-bearing product (e.g., food) that may be enclosed in a package comprising the film.

With respect to non-ionizing radiation, the radiation intensity may be measured at the surface of the film utilizing the types of detectors, filters, and radiometers that are correctly calibrated and appropriate for the wavelength ranges of the radiation being measured, as is known to those of skill in the art. See, for example, A. Ryer, "Light Measurement Handbook" (1998, International Light, Inc., Newburyport, Mass.), which is incorporated herein in its entirety by reference. For example, a silicon detector type may be useful for measuring the radiation intensity for radiation wavelengths of from about 250 to about 1050 nm, in conjunction with a radiometer such as the IL 1700 (International Light Inc.).

As is also known to those of skill in the art, if a broad range of non-ionizing radiation wavelengths contributes to the radiation being measured, then one or more filters may be used to reduce or eliminate the radiation wavelengths for which a particular detector type is not appropriate or optimum, and the previously filtered radiation wavelength ranges may be subsequently measured with an appropriate detector while filtering the previously measured radiation wavelengths. The total radiation intensity may be calculated by summing the radiation intensities of the separate measurements of different wavelength ranges.

The effective amount of radiation energy of the exposing step may be sufficient to structurally disrupt at least a portion of the SWNT material in the exposed film. The term "structurally disrupt" means structurally or chemically deconstruct or reconstruct (e.g., transform) into another structure or other structures, as for example, by ignition, liberation of adsorbed gas or liquid, burning, thermal energy exposure, temperature increase, or rapid rate of energy conversion. See, for example, U.S. patent application Ser. No. 10/725,209 filed Dec. 1, 2003 by Grah et al entitled "Method of Increasing the Gas Transmission Rate of a Film" (owned by the assignee of the present invention and published as U.S. Patent Application Publication U.S. 2005/0119364) and P. M. Ajayan et al, "Nanotubes in a Flash—Ignition and Reconstruction," Science, vol. 296, p. 705 (Apr. 26, 2002), each of which is incorporated in its entirety by reference. The radiation exposure step may structurally disrupt at least about any of the following amounts of SWNT material present in the film: 20, 30, 40, 50, 60, 70, 80, 90, 95, 99, and 100 weight %.

The effective amount of radiation energy of the exposing step may cause a rapid heating of the SWNT material and may structurally disrupt at least a portion of the SWNT material, which transfers heat to at least a portion of the film polymer in the vicinity of the SWNT material. Such heat may be generated with an intensity and duration such that the heat generated by the SWNT material does not increase the temperature of the polymer to the point where a significant amount of the polymer decomposes or is structurally disrupted, yet does raise the film temperature above the heat-shrink initiation temperature and activate the heat shrink characteristic.

Alternatively, the heat may be generated with an intensity and duration such that the temperature of the polymer in the vicinity of the SWNT material increases and at least a portion of such polymer may be structurally disrupted. The resulting deconstructed structures may tend to be liberated from the film or film layer, resulting in the film or one or more film layers being perforated, in addition to the initiation of the heat shrink characteristic.

After the radiation energy exposing step, the film or any of the layers of the film may be perforated or may be unperforated (i.e., the exposing of the film to the effective amount of radiation energy does not cause the film to be perforated). The exposed film may have any of the gas transmission rates discussed in this application either while the film or one or more layers of the film are perforated or while the film or one or more film layers are unperforated. The exposing step may not increase the oxygen transmission rate of the film by more than any of the following amounts relative to the oxygen transmission rate before the exposing step: 100, 200, 500, 1,000, and 5,000 cubic centimeters (at standard temperature and pressure) per square meter per day per 1 atmosphere of oxygen pressure differential measured at 0% relative humidity and 23° C.

The radiation-exposing step may cause the film to shrink in at least one direction by at least about, and/or at most about, any of the following: 5%, 7%, 10%, 15%, 25%, 30%, 40%, 45%, 50%, 55%, 60%, 70%, and 80%. The film may shrink in at least two directions (e.g., the machine and transverse directions) by any of the previous amounts. The film may shrink unequally in both directions, that is differing free shrink in the machine and transverse directions. The film may not shrink in both directions. For example, the film may shrink in one direction by less than about any of the following: 5%, 4%, 3%, 2% and 1%; or the film may not shrink in one direction as a result of the radiation exposing step.

The radiation-exposing step may cause the shrink tension in the film in at least one direction to increase by at least about, and/or at most about, any of the following: 100 psi, 175 psi, 200 psi, 225 psi, 250 psi, 275 psi, 300 psi, 325 psi, and 500 psi. The film may have an unequal increase in shrink tension in both directions, that is differing shrink tension in the machine and transverse directions. The film may not have an increase in shrink tension in one or both directions.

Useful equipment and methods for providing various types of radiation energy are known to those of skill in the art. For example, the radiation energy may be provided by a photoflash, a flashlamp (e.g., pulsed, gas-filled flashlamps), and spark-gap discharge apparatus. The radiation energy may also be provided by a pulsed lamp system such as those available from Xenon Corp. (Woburn, Mass.) (e.g., model RC-740, dual lamp and model RC-747 pulsating xenon light) and Maxwell Laboratories, Inc. (e.g., Flashblast Model FB-100 pulsed light system), and those described in U.S. Pat. Nos. 5,034,235 and 6,449,923.

Oxygen Transmission

The film may have an "initial" oxygen transmission rate, that is, the oxygen transmission rate before the radiation energy exposure step, of at most about any of the following values: 1,000, 500, 400, 300, 200, 150, 100, 50, 45, 40, 35, 30, 25, 20, 15, 10, and 5 cubic centimeters (at standard temperature and pressure) per square meter per day per 1 atmosphere of oxygen pressure differential measured at 0% relative humidity and 23° C. All references to oxygen transmission rate in this application are measured at these conditions according to ASTM D-3985.

The film may have an oxygen transmission rate after the radiation energy exposure step that is higher than the oxygen transmission rate of the film immediately before the radiation exposure step by at least about any of the following values: 100; 500; 1,000; 3,000; 5,000; 8,000; 10,000; 15,000; 20,000; 25,000; 30,000; 35,000; 40,000; 50,000; 100,000; 200,000; 400,000; 800,000; and 1,000,000 cubic centimeters (at standard temperature and pressure) per square meter per day per 1 atmosphere of oxygen pressure differential measured at 0% relative humidity and 23° C. The film may have an oxygen transmission rate after the radiation exposure step that is higher than the oxygen transmission rate of the film immediately before the radiation exposure step by at most about any of the following values: 10; 50; 100; 500; 1,000; 3,000; 5,000; 8,000; 10,000; 15,000; 20,000; 25,000; 30,000; 35,000; 40,000; 50,000; 60,000; 70,000; 90,000; 110,000; 200,000; and 400,000 cubic centimeters (at standard temperature and pressure) per square meter per day per 1 atmosphere of oxygen pressure differential measured at 0% relative humidity and 23° C. For example, the exposing step may not increase the oxygen transmission rate of the film by more than any of the values of the previous sentence.

The film after the radiation energy exposure step may have an oxygen transmission rate of at least about any of the following values: 100; 500; 1,000; 3,000; 5,000; 8,000; 10,000; 15,000; 20,000; 25,000; 30,000; 35,000; 40,000; 50,000; 100,000; 200,000; 400,000; 800,000; and 1,000,000 cubic centimeters (at standard temperature and pressure) per square meter per day per 1 atmosphere of oxygen pressure differential measured at 0% relative humidity and 23° C. The film after the radiation energy exposure step may have an oxygen transmission rate of at most about any of the following values: 3,000; 5,000; 8,000; 10,000; 15,000; 20,000; 25,000; 30,000; 35,000; 40,000; 50,000; 60,000; 70,000; 90,000; 110,000; 200,000; and 400,000 cubic centimeters (at standard temperature and pressure) per square meter per day per 1 atmosphere of oxygen pressure differential measured at 0% relative humidity and 23° C.

Water Vapor Transmission

The film may have an "initial" water vapor transmission rate, that is, the water vapor transmission rate before the radiation energy exposure step, of at most about any of the following values: 150, 100, 80, 60, 50, 40, 20, 15, 10, 5, 1, and 0.5 grams/100 in$^2$0.24 hours (100% humidity, 23° C.) measured according to ASTM F 1249-01 (for values at 20 grams or lower) and ASTM E 96 (for values above 20 grams). All references to water vapor transmission rate in this application are measured at these conditions.

The film may have a water vapor transmission rate after the radiation energy exposure step that is higher than the water vapor transmission rate of the film immediately before the radiation exposure step by at least about any of the following values: 500, 400, 300, 250, 200, 150, 100, 80, 60, 50, 40, 20, 15, 10, and 5 grams/100 in$^2$24 hours (100% humidity, 23° C.). The film may have a water vapor transmission rate after the radiation exposure step that is higher than the water vapor transmission rate of the film immediately before the radiation exposure step by at most about any of the following values: 1,000, 750, 500, 400, 300, 250, 200, 150, 100, 80, 60, 50, 40, 20, 15, and 10 grams/100 in$^2$0.24 hours (100% humidity, 73° F.).

The film after the radiation energy exposure step may have a water vapor transmission rate of at least about any of the following values: 500, 400, 300, 250, 200, 150, 100, 80, 60, 50, 40, 20, 15, 10, and 5 grams/100 in$^2$0.24 hours (100% humidity, 23° C.). The film after the radiation energy exposure step may have a water vapor transmission rate of at most about any of the following values: 1,000, 750, 500, 400, 300, 250, 200, 150, 100, 80, 60, 50, 40, 20, 15, and 10. The film after the radiation energy exposure step may have any of the above water vapor transmission rates while also not allowing the transmission of liquid water through the film.

Use of the Film

A package (e.g., a bag or a food package system) may comprise the film. For example, the film may be wrapped around an object and sealed around its edges. A bag may comprise the film, for example, by heat sealing the film to itself to form the bag into which an object (e.g., a food product) may be placed. The air pressure in the bag may be lowered (e.g., vacuum) and the bag subsequently sealed or clipped closed. Upon activation of the shrink characteristic of the film, the film may contract about the object to provide a tight package. The activation of the shrink characteristic of the film may occur without exposing the film to an external thermal heat source such as those sources used to activate shrink characteristics by thermal conduction (e.g., a water bath or hot-air tunnel).

To facilitate the contraction of the film, a vent hole may be cut into a portion of the film to allow trapped air to escape from the package as the film shrinks. The film may be perforated by the structural disruption of the SWNT material, as discussed above, to provide the venting function so that there is no need to cut a separate vent hole.

A lid may comprise the film, for example, where the lid is sealed to a tray to enclose a product; see, for example, U.S. Pat. No. 6,627,273 and U.S. patent application Ser. No. 10/201,441 filed Jul. 23, 2002, each of which is incorporated in its entirety herein by reference. Such lids may be modified to incorporate SWNT material as set forth in this Application. Upon activation of the shrink characteristic, the lid may form a tight, wrinkle-free appearance.

Objects that may be packaged in a package comprising the film include food (e.g., meat, such as fresh or frozen red meat or poultry, frozen pizzas), paper products (e.g., stationery, plates, cards, calendars), toys, games, hardware, and information storage devices (e.g., cassettes, compact discs).

A product that is used to provide a protective coating, surface, cladding, or insulation may incorporate the film of the present invention. Such a product may be used, for example, to reduce the likelihood of corrosion or an electrical short at a spice, cable termination, or feed-through assembly. Such a product may be a "heat shrink sleeve," a term that as used herein includes those products known in the telecommunication and power transmission fields as "splice closures," "heat shrink tubes," "heat recoverable tubes," and "cable seals." Any of these products may comprise the film of the present invention. For example, a tube may be made by sealing the film to itself, or the film may be made in tubular form. Upon activation of the shrink characteristic, a tubing comprising the film may form a tight enclosure to help protect the wire and splice from water exposure. Examples of the products identified in this paragraph are described in U.S. Pat. Nos. 3,455,337; 3,593,383; 3,717,717; 3,995,964; 4,035,534; 4,085,286; 4,017,715; 4,170,296; 4,207,364; 4,219,051; 4,421,582; 4,421,945; 4,424,246; 4,586,971; 4,915,990; 5,117,094; 5,360,945; 5,479,553; 5,528,718; 5,557,073; 5,692,299; 5,736,208; 6,107,574; 6,226,435; and 6,359,226, each of which is incorporated herein in its entirety by reference.

A tamper-evident shrink band (e.g., a neckband bottle seal or closure) may also comprise the film. The shrink band may span a container and its closure (e.g., a bottle neck and the cap) to form a tight fit after activation of the shrink characteristic. See, for example, U.S. Pat. No. 6,276,531 to Andrews; U.S. Pat. No. 5,904,266 to Tedeschi; U.S. Pat. No. 5,641,084 to Rice; U.S. Pat. No. 5,544,770 to Travisano; U.S. Pat. No. 5,292,018 to Travisano; U.S. Pat. No. 4,813,559 to Kenyon; and U.S. Pat. No. 4,782,976 to Kenyon, each of which is incorporated herein in its entirety by reference.

Any numerical ranges recited herein include all values from the lower value to the upper value in increments of one unit provided that there is a separation of at least 2 units between any lower value and any higher value. As an example, if it is stated that the amount of a component or a value of a process variable (e.g., temperature, pressure, time) may range from any of 1 to 90, 20 to 80, or 30 to 70, or be at least any of 1, 20, or 30 and at most any of 90, 80, or 70, then it is intended that values such as 15 to 85, 22 to 68, 43 to 51, and 30 to 32, as well as at least 15, at least 22, and at most 32, are expressly enumerated in this specification. For values that are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

The above descriptions are those of preferred embodiments of the invention. Various alterations and changes can be made without departing from the spirit and broader aspects of the invention as defined in the claims, which are to be interpreted in accordance with the principles of patent law, including the doctrine of equivalents. Except in the claims and the specific examples, or where otherwise expressly indicated, all numerical quantities in this description indicating amounts of material, reaction conditions, use conditions, molecular weights, and/or number of carbon atoms, and the like, are to be understood as modified by the word "about" in describing the broadest scope of the invention. Any reference to an item in the disclosure or to an element in the claim in the singular using the articles "a," "an," "the," or "said" is not to be construed as limiting the item or element to the singular unless expressly so stated. The definitions and disclosures set forth in the present Application control over any inconsistent definitions and disclosures that may exist in an incorporated reference. All references to ASTM tests are to the most recent, currently approved, and published version of the ASTM test identified, as of the priority filing date of this application. Each such published ASTM test method is incorporated herein in its entirety by this reference.

What is claimed is:

1. A method of shrinking a film comprising the steps of:
providing a film comprising one or more thermoplastic polymers and at least about 0.001 weight % of single-walled carbon nanotube material based on the weight of the film, wherein the film has a free shrink at 185° F. in at least one of the machine or transverse directions of at least about 5% measured according to ASTM D 2732; and
exposing the film to an amount of radiation energy effective to structurally disrupt at least a portion of the single-walled carbon nanotube material and activate the shrink characteristic of the film.

2. The method of claim 1 wherein the film of the providing step has a free shrink at 185° F. in at least one of the machine or transverse directions of at least about 20% measured according to ASTM D 2732.

3. The method of claim 1 wherein the film of the providing step has a free shrink at 185° F. in at least one of the machine or transverse directions of at least about 40% measured according to ASTM D 2732.

4. The method of claim 1 wherein the film of the providing step has a shrink tension at 185° F. in at least one of the machine or transverse directions of at least about 100 psi measured according to ASTM D 2838 (Procedure A).

5. The method of claim 1 wherein the film of the providing step has a shrink tension at 185° F. in at least one of the machine or transverse directions of at most about 250 psi measured according to ASTM D 2838 (Procedure A).

6. The method of claim 1 wherein the exposing step causes the free shrink at 220° F. in at least one direction of the film to decrease by at least about 10%.

7. The method of claim 1 wherein the exposing step causes the shrink tension at 220° F. in at least one direction of the film to decrease by at least about 10%.

8. The method of claim 1 wherein the radiation energy amount comprises a surface dose of non-ionizing radiation of at least about 0.01 mJ/cm2 that is delivered within a duration of at most about 30 seconds.

9. The method of claim 1 wherein the radiation energy amount comprises a surface dose of non-ionizing radiation of at least about 1 mJ/cm2 that is delivered within a duration of at most about 10 seconds.

10. The method of claim 1 wherein the radiation exposure step comprises a radiation intensity of non-ionizing radiation at the surface of the film of at least about 10 mW/cm2.

11. The method of claim 1 wherein the radiation exposure step comprises a radiation intensity of non-ionizing radiation at the surface of the film of at least about 50 mW/cm2.

12. The method of claim 1 wherein the radiation exposure step comprises a radiation intensity of non-ionizing radiation at the surface of the film of at least about 500 mW/cm2.

13. The method of claim 1 wherein the film of the providing step comprises at least one layer comprising at least about 50% of the single-walled carbon nanotube material by weight of the total amount of single-walled carbon nanotube material in the film.

14. The method of claim 1 wherein the film of the providing step comprises a shrink layer comprising at least about 50% of the single-walled carbon nanotube material by weight of the total amount of single-walled carbon nanotube material in the film.

15. The method of claim 1 wherein the film of the providing step comprises at least about 50% of one or more polyolefins by weight of the film.

16. The method of claim 1 wherein the film of the providing step comprises at least about 50% of one or more vinyl plastics by weight of the film.

17. The method of claim 1 wherein the film of the providing step is monolayer.

18. The method of claim 1 wherein the film of the providing step comprises at least three layers.

19. The method of claim 1 wherein the film of the providing step is at least about 1 mil in thickness.

20. The method of claim 1 wherein the step of exposing to the effective amount of radiation energy occurs within at most about 30 seconds.

21. The method of claim 1 wherein the step of exposing to the effective amount of radiation energy occurs within at most about 10 seconds.

22. The method of claim 1 wherein the step of exposing to the effective amount of radiation energy occurs within at most about 1 second.

23. The method of claim 1 wherein the step of exposing to the effective amount of radiation energy occurs within at most about 0.01 seconds.

24. The method of claim 1 wherein the radiation exposure step comprises exposing to an effective amount of non-ionizing radiation comprising at least about 50% visible light energy.

25. The method of claim 1 wherein the radiation exposure step comprises exposing to an effective amount of non-ionizing radiation comprising at least about 50% infrared light energy.

26. The method of claim 1 wherein the radiation exposure step comprises exposing to an effective amount of non-ionizing radiation comprising at least about 50% ultraviolet light energy.

27. The method of claim 1 wherein the effective amount of radiation energy of the exposing step is delivered discontinuously by at least two pulses.

28. The method of claim 1 wherein the film of the providing step comprises at least one layer comprising at least about 0.01 weight % single-walled carbon nanotube material by weight of the layer.

29. The method of claim 1 wherein the film of the providing step comprises at least one layer comprising at least about 0.1 weight % single-walled carbon nanotube material by weight of the layer.

30. The method of claim 1 wherein the film of the providing step comprises at least one layer comprising at least about 0.5 weight % single-walled carbon nanotube material by weight of the layer.

31. The method of claim 1 wherein the film of the providing step comprises at least one layer comprising at least about 1 weight % single-walled carbon nanotube material by weight of the layer.

32. The method of claim 1 wherein the film of the providing step comprises at least one layer comprising at least about 5 weight % of single-walled carbon nanotube material by weight of the layer.

33. The method of claim 1 wherein the exposing step structurally disrupts at least about 50 weight % of the single-walled carbon nanotube material present in the film of the providing step.

34. The method of claim 1 wherein:
the film of the providing step is unperforated; and
the step of exposing of the film to the effective amount of radiation energy causes the film to be perforated with a plurality of apertures.

35. The method of claim 1 wherein:
the film of the providing step is unperforated; and
the exposing of the film to the effective amount of radiation energy does not cause the film to be perforated.

36. The method of claim 1 wherein the film comprises:
an outer layer of the film; and
one or more discontinuous regions supported by the outer layer of the film,
wherein the one or more discontinuous regions comprise at least a portion of the single-walled carbon nanotube material.

37. The method of claim 1 wherein the film comprises:
an outer layer of the film; and
one or more discontinuous regions supported by the outer layer of the film,
wherein the one or more discontinuous regions comprise thermoplastic polymer and at least a portion of the single-walled carbon nanotube material.

* * * * *